UNITED STATES PATENT OFFICE.

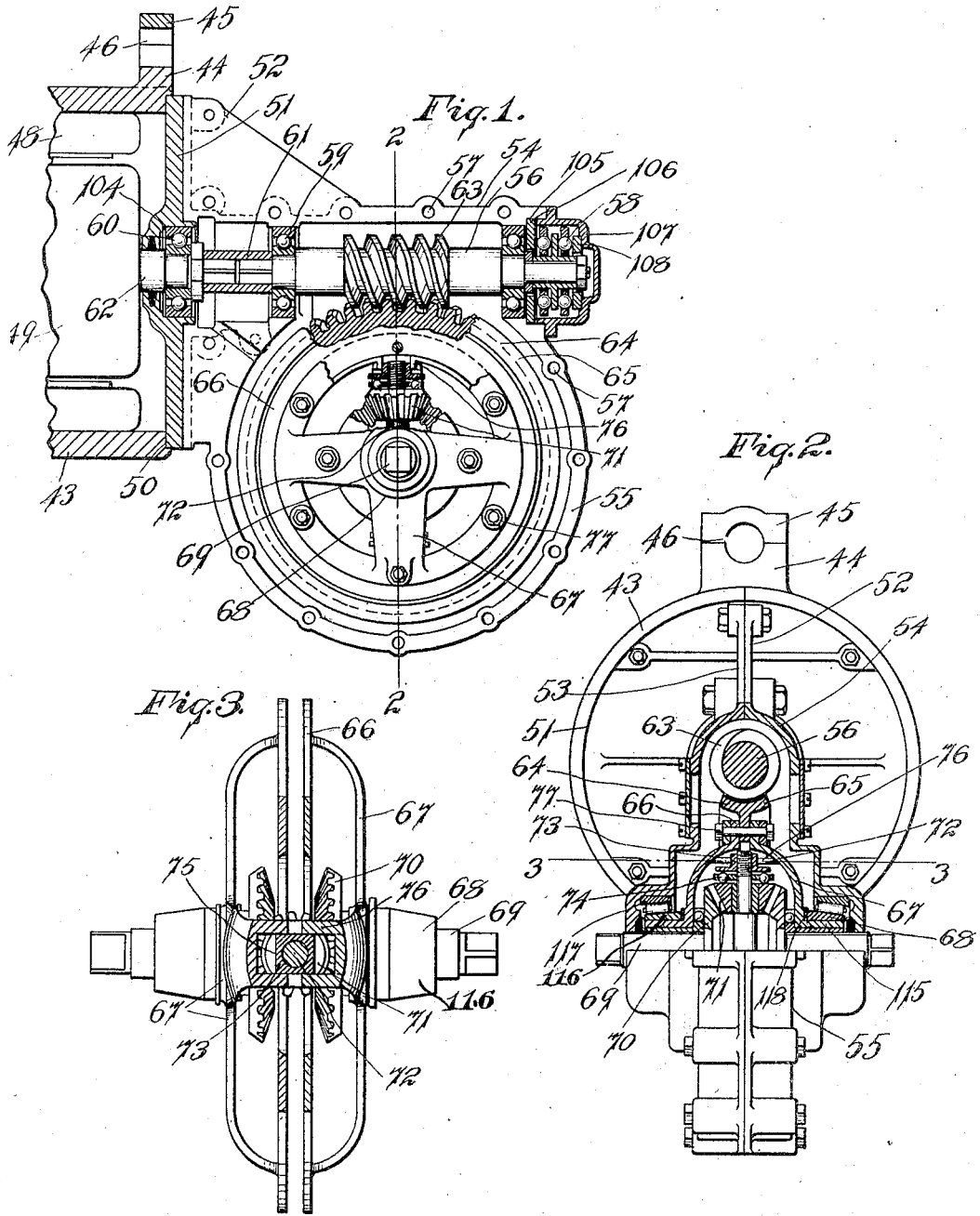

HIRAM P. MAXIM, OF HARTFORD, CONNECTICUT, ASSIGNOR TO THE WAVERLEY COMPANY, OF INDIANAPOLIS, INDIANA, A CORPORATION OF INDIANA.

DRIVING-GEARING FOR MOTOR-VEHICLES.

1,103,978.   Specification of Letters Patent.   Patented July 21, 1914.

Application filed March 15, 1912. Serial No. 684,000.

*To all whom it may concern:*

Be it known that I, HIRAM P. MAXIM, a citizen of the United States, and a resident of Hartford, in the county of Hartford and State of Connecticut, have invented a new Improvement in Driving-Gearing for Motor-Vehicles, of which the following is a specification.

My invention relates to the type of mechanism above mentioned and an object of the invention, among others, is to provide a driving gearing that shall be particularly efficient in its method of operation.

One form of device embodying my invention and in the construction and use of which the object above set out, as well as others, may be attained is illustrated in the accompanying drawings in which—

Figure 1 is a detail view in side elevation showing a portion of a motor casing with my improved driving gearing connected thereto, the parts being shown partially in section. Fig. 2 is a view partially in section through the gear casing and contained parts on the plane denoted by dotted line 2—2 of Fig. 1. Fig. 3 is a view in section through a portion of the mechanism on the plane denoted by dotted line 3—3 of Fig. 2, scale enlarged over Fig. 2.

While I have selected a motor vehicle for the purpose of illustrating and describing my invention herein it will be understood that I do not necessarily limit the invention to such a construction although it finds ready adaption thereto, and especially to that type of motor vehicle illustrated and described in my co-pending application of Serial Number 418,056, filed February 27th, 1908, the present application being a division from said co-pending application.

In the accompanying drawings the numeral 43 denotes a motor casing of the electric type having lugs 44 to which caps or straps 45 are secured forming an opening 46 serving as a means for suspending the motor casing from any suitable part of the vehicle frame. This motor may be of any approved type of construction including fields 48 and an armature 49, the casing 43 being recessed as at 50 at the end of the opening into the casing. A plate 51 is rigidly secured to the casing to close this opening, and a housing for a portion of the driving mechanism is firmly secured to this plate. This housing is preferably formed in two sections 52—53 and including as a whole a tubularly formed portion 54, overlying a circularly formed portion 55. The two sections of the housing meet preferably on the line of the axis of a shaft 56 and are secured as by means of bolts passing through openings 57 in flanges on the sections of the housing.

The shaft 56 extends lengthwise of the tubular portion 54 of the casing and has suitable bearings therein preferably of the ball type, the bearing 58 at the outer end of the shaft being a ball thrust bearing of any suitable form, and the bearing 59 being of the ball bearing type, also of any suitable form of construction.

The plate 51 is recessed as at 104 for the reception of the ball bearings 60, it being understood that this bearing includes the balls and its casing and bearing ring. The tubular portion 54 is counterbored as at 105 to receive the bearing plate 106 against which balls of the thrust bearing rest. A cap 107 is secured to the tubular portion 54 to close the opening in the end thereof, this cap having a bearing plate 108 opposing thrust of the balls against the plate 106. The tube 54 is suitably formed as shown to receive and retain the various ball bearings.

A coupling 61 unites the shaft 56 with the motor shaft 62, the latter being mounted in the ball bearing 60 above described. A worm member 63 of a worm gearing is located on the shaft 56, this gear having a steep pitch. In the form herein shown it includes a plural number of spirals or teeth, each of course extending one or more times about the shaft.

The gear 63 meshes with a wheel 64 which includes in its construction a ring 65 having teeth suitably formed to mesh with helices or teeth on the gear 63, said ring being inclosed between rims 66 secured to the outer ends of arms 67. These arms project from a hub 68, there being two rows of arms about the hub, as shown in Fig. 3 of the drawings, the hub in fact consisting of two members joined by the arms and rims to form the wheel 64. The hub of this wheel is loosely mounted upon shaft 69 comprising separate parts mounted in the sections 52—53 of the housing and having the usual compensating gears 70 secured thereto and meshing with a bevel pinion 71 upon a stud 72 secured to the worm wheel 64.

My invention contemplates such adjustment between the members of the compensating gears as to cause the members to accurately mesh, this adjustment being readily manipulated to take up any wear between the parts.

In the form of the invention as herein shown the stud 72 is threaded, as seen in Fig. 1 of the drawings, and a nut 73 is located upon this threaded portion of the stud. The nut is flanged and ball bearings 74 are located between the back of the pinion 71 and this flange on the nut. The nut is squared as at 75, or may be made of other non-circular shape, and lips 76 extend from the arms 67 located on opposite sides of the nut to rest against its squared portion, there being two lips from each arm as plainly shown in Fig. 3 of the drawings. It will be seen from this construction that the nut is securely held against turning movement, but by loosening the bolts 77 that hold the two rim members of the worm wheel together the lips may be disengaged from the nut, the latter turned to properly adjust the parts, and then by securing the rims in position the nut is securely held against accidental movement. The compensating shaft 69 may be connected at each end with the inner sections of a driving shaft, universal joints of any approved form and construction uniting the ends of the compensating shaft with the sections of the driving shaft in a manner well known.

I do not limit my invention as embodying a construction exactly like that herein shown and described as such a construction may be changed to a greater or lesser degree and yet include the invention herein disclosed.

My improved device is especially constructed to provide means for causing perfect intermeshing of the two members of the worm gearing and at the same time produce a satisfactory bearing. To this end the journals 68 of the worm wheel 64 include tapered sleeves 116 between which and a tapered bearing 117 the rollers are mounted. Washers 118 are located between the sides of the worm wheel and the ends of tapered sleeves 116. By transposing the washers from one side to the other of the worm wheel its position with respect to the meshing worm member or worm may be changed to cause a perfect mesh between said members. By introducing washers any wear between the parts may be taken up, this construction allowing the worm wheel to be changed laterally without affecting the bearing parts.

I claim—

1. A rotating member, driven members, operative connections between the rotating member and driven member, said connections including a pinion supported by the rotating member and connected with the driven members, a threaded stud bearing said pinion; a nut on the threaded stud and supporting the thrust of said pinion, said rotating member having means for preventing rotation of the nut, and means for driving the rotating member.

2. A rotating member having ears projecting therefrom, a threaded stud borne by the rotating member, a pinion mounted on said stud, a nut located on the stud and supporting the thrust of said pinion, said ears on the rotating member acting to hold the nut against rotation, means for driving the rotating member, and driven members operatively connected with said pinion.

3. A rotating member, a threaded stud borne by the rotating member, a pinion mounted on said stud, a nut threaded on the stud and having a flange supporting the thrust of said pinion and a non-circular shaped portion, said rotating member having ears engaging said non-circular shaped portion of the nut to hold it against rotation, means for driving the rotating member, and driven members operatively connected with said pinion.

4. A rotating member including separable side parts, a threaded stud borne by the rotating member, a pinion mounted on the stud, a nut threaded on the stud and supporting the thrust of said pinion, the separable parts of the rotating member having means located in coacting engagement with the nut to hold it against rotation, means for driving the rotating member, and driven members operatively connected with the rotating member.

5. In a driving mechanism for motor vehicles, a gear including two sections each including a hub, arms projecting radially therefrom, and a rim supported at the outer end of said arms thus forming a cage, a toothed ring clamped between said rims, a threaded stud secured between said rims and projecting inwardly, a nut located on the threaded portion of the stud, a pinion supported on the stud and backed by said nut, said rims having oppositely disposed ears projecting to hold said nut from rotation, and driven mechanism located within said cage and connected with said pinion.

6. In a driving mechanism for motor vehicles, a rotating member, driven members, operative connections between said members, said connections comprising a stud rigidly secured to the rotating member and having its outer end threaded, a pinion supported on said stud and connected with the driven members, a nut engaging the thread on the stud and movable lengthwise on said stud, said nut supporting the thrust of the pinion, means on the rotating member for preventing rotation of the nut, and means for driving the rotating member.

HIRAM P. MAXIM.

Witnesses:
 ARTHUR B. JENKINS,
 EVA L. STOUGHTON.